US012394147B2

(12) United States Patent
Krishnan et al.

(10) Patent No.: US 12,394,147 B2
(45) Date of Patent: Aug. 19, 2025

(54) RENDERING AND DISPLAYING A 3D REPRESENTATION OF AN ANATOMICAL STRUCTURE

(71) Applicant: KONINKLIJKE PHILIPS N.V., Eindhoven (NL)

(72) Inventors: Karthik Krishnan, Bangalore (IN); Celine Firtion, Surat (IN); Pallavi Vajinepalli, Bangalore (IN); Saunak Chatterjee, Bangalore (IN); Giridhar Narasapura Rajagopalaiah, Bangalore (IN); Matthew Rielly, Seattle, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 269 days.

(21) Appl. No.: 18/034,901

(22) PCT Filed: Nov. 1, 2021

(86) PCT No.: PCT/EP2021/080229
§ 371 (c)(1),
(2) Date: May 2, 2023

(87) PCT Pub. No.: WO2022/096404
PCT Pub. Date: May 12, 2022

(65) Prior Publication Data
US 2023/0419602 A1    Dec. 28, 2023

Related U.S. Application Data

(60) Provisional application No. 63/110,184, filed on Nov. 5, 2020.

(51) Int. Cl.
G06T 17/00       (2006.01)
G06T 7/00        (2017.01)
(Continued)

(52) U.S. Cl.
CPC ............ *G06T 17/00* (2013.01); *G06T 7/0012* (2013.01); *G06T 7/20* (2013.01); *G06T 7/30* (2017.01);
(Continued)

(58) Field of Classification Search
None
See application file for complete search history.

(56) References Cited

U.S. PATENT DOCUMENTS 8,265,363 B2      9/2012  Orderud et al.
2010/0040200 A1*  2/2010  Ema ................... A61B 6/503
                                                   378/98.12
(Continued)

FOREIGN PATENT DOCUMENTS

EP    2736015 A1    5/2014
WO    2014039935 A1  3/2014
(Continued)

OTHER PUBLICATIONS

International Search Report and Written Opinion for PCT/EP2021/080229, Mailing date: Mar. 15, 2022, 10 pages.
(Continued)

*Primary Examiner* — Frank S Chen

(57) ABSTRACT

There is proposed a mechanism for generating and displaying a 3D representation of an anatomical structure of an individual. Image data of the anatomical structure is obtained and processed to obtain 2D images or image sequences corresponding to predetermined views of the anatomical structure. Anatomical landmarks are identified in the 2D images or image sequences and used to determine a 3D landmark model of the anatomical 5 structure. The 3D landmark model is used to render and display a 3D representation of the anatomical structure.

15 Claims, 4 Drawing Sheets

(51) Int. Cl.
    *G06T 7/20* (2017.01)
    *G06T 7/30* (2017.01)
    *G06V 10/25* (2022.01)
(52) U.S. Cl.
    CPC .... *G06V 10/25* (2022.01); *G06T 2207/30048* (2013.01); *G06V 2201/03* (2022.01); *G06V 2201/07* (2022.01)

(56) References Cited

U.S. PATENT DOCUMENTS

| | | | |
|---|---|---|---|
| 2010/0168573 A1* | 7/2010 | Sherrill | G01S 7/52088 600/443 |
| 2010/0185088 A1* | 7/2010 | Perrey | A61B 8/08 600/443 |
| 2010/0195881 A1 | 8/2010 | Orderud et al. | |
| 2015/0045662 A1* | 2/2015 | Kim | A61B 8/5223 600/437 |
| 2015/0190112 A1 | 7/2015 | Yeo et al. | |
| 2015/0302638 A1* | 10/2015 | Jago | G06T 7/30 345/420 |
| 2016/0038125 A1* | 2/2016 | Haas | A61B 8/0883 600/440 |
| 2017/0018204 A1* | 1/2017 | Savitsky | G09B 23/286 |
| 2017/0238904 A1* | 8/2017 | Perrey | A61B 8/483 |
| 2018/0342072 A1* | 11/2018 | Raudins | G06T 7/292 |
| 2023/0064623 A1 | 3/2023 | Krishnan et al. | |

FOREIGN PATENT DOCUMENTS

| | | |
|---|---|---|
| WO | 2015068099 A1 | 5/2015 |
| WO | 2019145027 A1 | 8/2019 |

OTHER PUBLICATIONS

Ford, S. et al., "HeartPad: real-time visual guidance for cardiac ultrasound", WASA '12: Proceedings of the Workshop at SIGGRAPH, 2012, 8 pages.

Yeo, L. et al., "Fetal Intelligent Navigation Echocardiography (FINE): a novel method for rapid, simple, and automatic examination of the fetal heart", 2013, vol. 42, No. 3, pp. 268-284.

Mabee, M., "Novel Indices for the Diagnosis of Infant Hip Dysplasia Using Two and Three Dimensional Ultrasound", retrieved from https://era.library.ualberta.ca/files/9593tv45n/Mabee_Myles_G_201408_MSc.pdf, 2017, 120 pages.

Sra J. et al., "Cardiac image registration of the left atrium and pulmonary veins", Heart Rhythm, 2008, vol. 5, No. 4, pp. 609-617.

Bridge, C. et al., "Automated annotation and quantitative description of ultrasound videos of the fetal heart", Medical Image Analysis, 2017, vol. 36, pp. 147-161.

Patra, A. et al., "Learning Spatio-Temporal Aggregation for Fetal Heart Analysis in Ultrasound Video", DLMIA ML-CDS, Lecture Notes in Computer Science, 2017, vol. 10553, 8 pages.

Buethe, J. et al., "Eponymous Cardiovascular Surgeries for Congenital Heart Diseases-Imaging Review and Historical Perspectives", Current Problems in Diagnostic Radiology, vol. 44, Issue 4, pp. 303-320.

Donofrio, M.T. et al., "Diagnosis and Treatment of Fetal Cardiac Disease: A Scientific Statement From the American Heart Association", Circulation, 2014, vol. 129, Issue 21, pp. 2183-2242.

Holland, B.J. et al., "Prenatal diagnosis of critical congenital heart disease reduces risk of death from cardiovascular compromise prior to planned neonatal cardiac surgery: a meta-analysis", Ultrasound Obstet Gynecol 2015; vol. 45, pp. 631-638.

Wright, L.K. et al., "Relation of Prenatal Diagnosis With One-Year Survival Rate for Infants With Congenital Heart Disease", Am J Cardiol., 2014, vol. 113, pp. 1041-1044.

Li, Y-F. et al., "Efficacy of prenatal diagnosis of major congenital heart disease on perinatal management and perioperative mortality: a meta-analysis", World J Pediatr, 2016, vol. 12, pp. 298-307.

Oster, M. et al., "A population-based study of the association of prenatal diagnosis with survival rate for infants with congenital heart defects", Am J Cardiol., 2014, vol. 113, No. 6, pp. 1036-1040.

Friedberg, M.K. et al., "Prenatal detection of congenital heart disease", Journal of Pediatrics, 2009, vol. 155, No. 1, pp. 26-31.

Sekar, P. et al., "Diagnosis of congenital heart disease in an era of universal prenatal ultrasound screening in southwest Ohio", Cardiology in the Young, 2013, vol. 25, Issue 1, Abstract Only.

Carvalho, JS. et al., "ISUOG Practice Guidelines (updated): sonographic screening examination of the fetal heart", Ultrasound Obstet Gynecol., 2013, vol. 41, pp. 348-359.

Arnaout R. et al., "Deep-learning models improve on community-level diagnosis for common congenital heart disease esions", arXiv:1809.06993v1, 2018, 17 pages.

Guardado, J.R., "Medical Liability Claim Frequency Among U.S. Physicians, Policy Research Perspectives", American Medical Associations, 2016, 10 pages.

Anonymous, "AIUM Practice Parameter for the Performance of Fetal Echocardiography", J Ultrasound Med., 2020, vol. 39, Issue 1, E5-E16, 12 pages.

Lee, W. et al., "ISUOG consensus statement: what constitutes a fetal echocardiogram", Ultrasound Obstet Gynecol, 2008, vol. 32, pp. 239-242.

Nelson, TR. et al. "Three-dimensional echocardiographic evaluation of fetal heart anatomy and function: acquisition analysis and display", J Ultrasound Med., 1996, vol. 15, Issue 1, pp. 1-9.

Vinals, F. et al., "Accuracy of prenatal diagnosis of congenital heart defects evaluating the STIC sweep of the acquisition plane", Ultrasound in Obstetrics & Gynecology, 2006, vol. 28, pp. 359-411.

Hadlock, F. et al., "Estimating fetal age: effect of head shape on BPD", American Journal of Roentgenology, 1981, vol. 137, pp. 83-85.

Marzbanrad, F. et al., "Assessment of Fetal Development Using Cardiac Valve Intervals", Front Physiol., 2017, vol. 8, Article 313, 13 pages.

Yeo, L. et al., "Fetal Intelligent Navigation Echocardiography (FINE) Detects 98% of Congenital Heart Disease", J Ultrasound Med., 2018, vol. 37, No. 11, pp. 2577-2593.

Yaman, C. et al., "Ultrasound Technology Update: 4D fetal echocardiography Spatio-Temporal Image Correlation (STIC) for Fetal Heart Acquisition", J Turkish German Gynecol Assoc, 2004, vol. 5, No. 4, pp. 286-289.

\* cited by examiner

RENDERING AND DISPLAYING A 3D REPRESENTATION OF AN ANATOMICAL STRUCTURE

CROSS-REFERENCE TO PRIOR APPLICATIONS

This application is the U.S. National Phase application under 35 U.S.C. § 371 of International Application No. PCT/EP2021/080229, filed on Nov. 1, 2021, which claims the benefit of U.S. Provisional Patent Application No. 63/110,184, filed on Nov. 5, 2020. These applications are hereby incorporated by reference herein.

FIELD OF THE INVENTION

The present invention relates to the field of image rendering, and in particular, to the rendering and displaying of a representation of an anatomical structure.

BACKGROUND OF THE INVENTION

Congenital heart diseases (CHD) are among the most common types of birth defects, affecting one percent of live births. CHD can be asymptomatic in fetal life but cause significant morbidity and mortality after birth. The earlier CHD is diagnosed, the better the outcomes and therapeutic options at birth. In particular, effective in utero therapies for specific CHD lesions, such as in utero aortic valvuloplasty for hypoplastic left heart syndrome, are becoming increasing available, and have been shown to significantly improve the natural history of disease.

However, these potential benefits rely on accurate fetal ultrasound diagnosis of CHD. It has been recognized that the fetal diagnosis rate for CHD in the community is in the region of 30-50%, even where fetal ultrasound is universal in the developed nations. However, in theory, a thorough screening of the fetal heart should be able to detect 90% of abnormalities.

The main reason for this diagnosis gap is inadequate/inconsistent/uneven expertise in acquiring the right cardiac planes and interpreting fetal cardiac images. This is believed to be primarily due to the diagnostic challenge presented by a small and fast-beating fetal heart and due to relatively low exposure to each specific type of congenital heart disease among caregivers. Signs of cardiac disease are often subtle, can touch a variety of structures within the heart such as the valves, the septum, the heart muscle, etc., and present under multiple forms/associations (Fallot Tetralogy) necessitating a carefully targeted examination.

There is therefore a need for intuitive, precise, dynamic and interactive display of the fetal heart, to facilitate identification of cardiac anomalies.

In particular, there is a clear need for improved rendering and display of anatomical structures, such as a (fetal) heart, in order to improve clinician's understanding and capability to identify and assess the condition of a patient.

SUMMARY OF THE INVENTION

The invention is defined by the claims.

According to examples in accordance with an aspect of the invention, there is provided a computer-implemented method of generating and displaying a 3D representation of an anatomical structure of an individual.

The computer-implemented method comprises: obtaining image data of the anatomical structure; processing the image data to generate a 3D anatomical model of the anatomical structure; processing the image data and/or the 3D anatomical model to obtain one or more sets of one or more 2D images, each identified set of one or more 2D images representing a different predetermined view of the anatomical structure; identifying one or more predetermined anatomical landmarks in each set of one or more 2D images; processing the one or more predetermined anatomical landmarks to generate a 3D landmark model; and processing the 3D anatomical model and the 3D landmark model to render and display a 3D representation of the anatomical structure at an output display.

The present disclosure recognizes that image data, usable for generating/rendering a 3D representation of an anatomical structure, can also be used to generate a 3D landmark model, which is based on any identified anatomical landmarks of the anatomical structure. It is also recognized that this 3D landmark model can be used to control or provide additional information about a 3D display of the anatomical structure, in order to provide improved ease in assessing or analyzing the condition of an individual.

Thus, the present invention relates to a mechanism for performing 3D rendering and display, by using a 3D landmark model to control how a 3D representation of an anatomical structure is rendered and/or displayed. This provides a new mechanism for generating a display of a 3D representation of the anatomical structure. By taking anatomical landmarks into account, more clinically relevant rendering and displaying of an anatomical structure can take place, to provide a clinician with additional and/or more relevant data for assessing a subject.

There is provided a method for rendering and displaying a 3D representation of the anatomical structure. The rendering and/or the displaying is based upon a 3D landmark model, which identifies/represents the position of anatomical landmarks of a subject in a 3D co-ordinate space.

The image data may comprises image data of the anatomical structure captured over at least one cycle of a cyclic movement of the anatomical structure, and each set of one or more 2D images comprises a sequence of 2D images that represent at least one cycle of the cyclic movement of the anatomical structure; and the step of processing the one or more predetermined anatomical landmarks comprises tracking, in each sequence of 2D images, one or more predetermined landmarks; and generating the 3D landmark model based on the tracked one or more predetermined landmarks in each sequence of 2D images.

Thus, the 3D landmark model may identify the change in the positions of the anatomical landmarks of the subject over a time period. This effectively allows the position of the anatomical landmarks in a 3D space to be tracked over time. This approach facilitates changing how the rendering/displaying of the 3D anatomical model is performed as the position of certain landmarks change, allowing different types of information to be drawn to the clinicians attention as the 3D representation changes over time.

The step of processing the 3D anatomical model and the 3D landmark model preferably comprises defining at least one rendering parameter based on the 3D landmark model. The at least one rendering parameter may include one or more of the following: a cutting plane of the rendered 3D representation; a viewing direction of the rendered 3D representation; a lighting parameter of the rendered 3D representation; one or more textures of the rendered 3D representation; and/or one or more colors of the rendered 3D representation.

The present disclosure appreciates that the rendering of the anatomical model can be made more relevant and/or provide additional information to a clinician by controlling certain rendering parameters based on the landmark model. This can facilitate provision of certain anatomical views, or highlighting of certain anatomical features, based on the determined anatomical landmarks. This can provide a user with additional information that was not previously available, e.g. to draw attention to certain positions or areas of the rendering of the anatomical structure.

This embodiment thereby provides a new mechanism for rendering a 3D representation of the anatomical structure, i.e. provides a new and improved approach for image processing.

A cutting plane is sometimes referred to as a "clipping plane" or a "section plane", and defines a plane in 3D space. When rendering, parts of the anatomical structure falling on one side of the cutting plane are rendered, and parts of the anatomical structure on the other side of the cutting plane are not rendered. This can provide a view in which parts of the anatomical structure are not displayed, to facilitate investigation of the interior of the anatomical structure.

A viewing direction defines the position of a virtual camera, to thereby control the apparent rotation and/or position of the 3D representation of the anatomical structure with respect to the display. Thus, as the viewing direction changes, so the apparent rotation and/or position of the 3D representation displayed at the output display.

Optionally, the step of processing the one or more predetermined anatomical landmarks comprises mapping the one or more predetermined landmarks in each set of one or more 2D images to a 3D co-ordinate system, to thereby generate a 3D landmark model.

In some examples, the step of displaying the 3D representation of the anatomical structure comprises: registering the 3D landmark model and the 3D representation in the same 3D co-ordinate space; and controlling the rendering of the 3D representation of the anatomical structure based on the 3D landmark model of the anatomical structure.

The step of rendering and displaying the 3D representation of the anatomical structure may comprise: defining a viewing direction for the 3D representation of the anatomical structure based on the 3D landmark model and a desired anatomical feature and/or anatomical view; and rendering and displaying the 3D representation of the anatomical structure based on the defined viewing direction.

The step of rendering and displaying the 3D representation of the anatomical structure may comprise: defining one or more cutting planes for the 3D representation of the anatomical structure based on the 3D landmark model and a desired anatomical feature and/or anatomical view; and rendering and displaying the 3D representation of the anatomical structure based on the one or more defined cutting planes.

The method may further comprise a step of receiving, at a user interface, a first user input indicating the desired anatomical feature or anatomical view. Thus, a user may be able to define the content of the rendered 3D representation of the anatomical structure, i.e. what anatomical features are to be contained within the (rendered) 3D representation of the anatomical structure.

In some examples, the desired anatomical feature and/or anatomical view is one of a plurality of predetermined anatomical views of the anatomical structure. Optionally, the selection of the predetermined anatomical view may be made by a user, i.e. a user can select one of a plurality of predetermined anatomical views. This approach can facilitate improved ease in selecting appropriate anatomical views for assessing the condition of a patient (e.g. to align an anatomical view provided by the 3D representation with well-established anatomical views).

In other examples, the desired anatomical feature and/or anatomical view is a predetermined anatomical feature/view, e.g. based upon a standard operating procedure for viewing features/views for a particular diagnosis or analysis methodology.

The step of rendering and displaying the 3D representation of the anatomical structure may comprise: receiving, at a user interface, a second user input indicating one or more desired viewing directions and/or cutting planes for the 3D representation of the anatomical structure; rendering and displaying the 3D representation of the anatomical structure based on the received second user input; using the 3D landmark model to predict the anatomical feature and/or anatomical view provided by the displayed 3D representation of the anatomical structure; and, displaying information on the predicted anatomical feature and/or anatomical view provided by the displayed 3D representation of the anatomical structure.

The anatomical structure may comprise a heart. The invention is particularly advantageous when employed for providing 3D representations of the heart, as the identification of anatomical cardiac landmarks is particularly well-developed so that generating a 3D landmark model of the heart is a particularly well-suited example. However, in other embodiments the anatomical structure may include the brain, the lungs and so on.

In some examples, each identified set of one or more 2D images represents a different one of the following: a four chamber view, a left ventricular outflow tract view; a right ventricular outflow tract view; a three-vessel view; a three vessel and trachea view; an abdominal situs view; an aortic arch view; and/or a ductal arch view.

The step of processing the image data and/or the 3D anatomical model may comprise processing the image data and/or the 3D anatomical model using a machine-learning method to identify one or more sets of one or more 2D images.

There is also proposed a computer program product comprising computer program code means which, when executed on a computing device having a processing system, cause the processing system to perform all of the steps of any herein described method.

There is also proposed a processing system for generating and displaying a 3D representation of an anatomical structure of an individual. The processing system is configured to: obtain image data of the anatomical structure; process the image data to generate a 3D anatomical model of the anatomical structure; process the image data and/or the 3D anatomical model to obtain one or more sets of one or more 2D images, each identified set of one or more 2D images representing a different predetermined view of the anatomical structure; identify one or more predetermined anatomical landmarks in each set of one or more 2D images; process the one or more predetermined anatomical landmarks to generate a 3D landmark model; and process the 3D anatomical model and the 3D landmark model to render and display a 3D representation of the anatomical structure at an output display.

The skilled person would be readily capable of adapting this processing system to perform any method herein described. Similarly, the skilled person would be readily capable of adapted any herein described method to carry out the operation of any herein described processing system.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
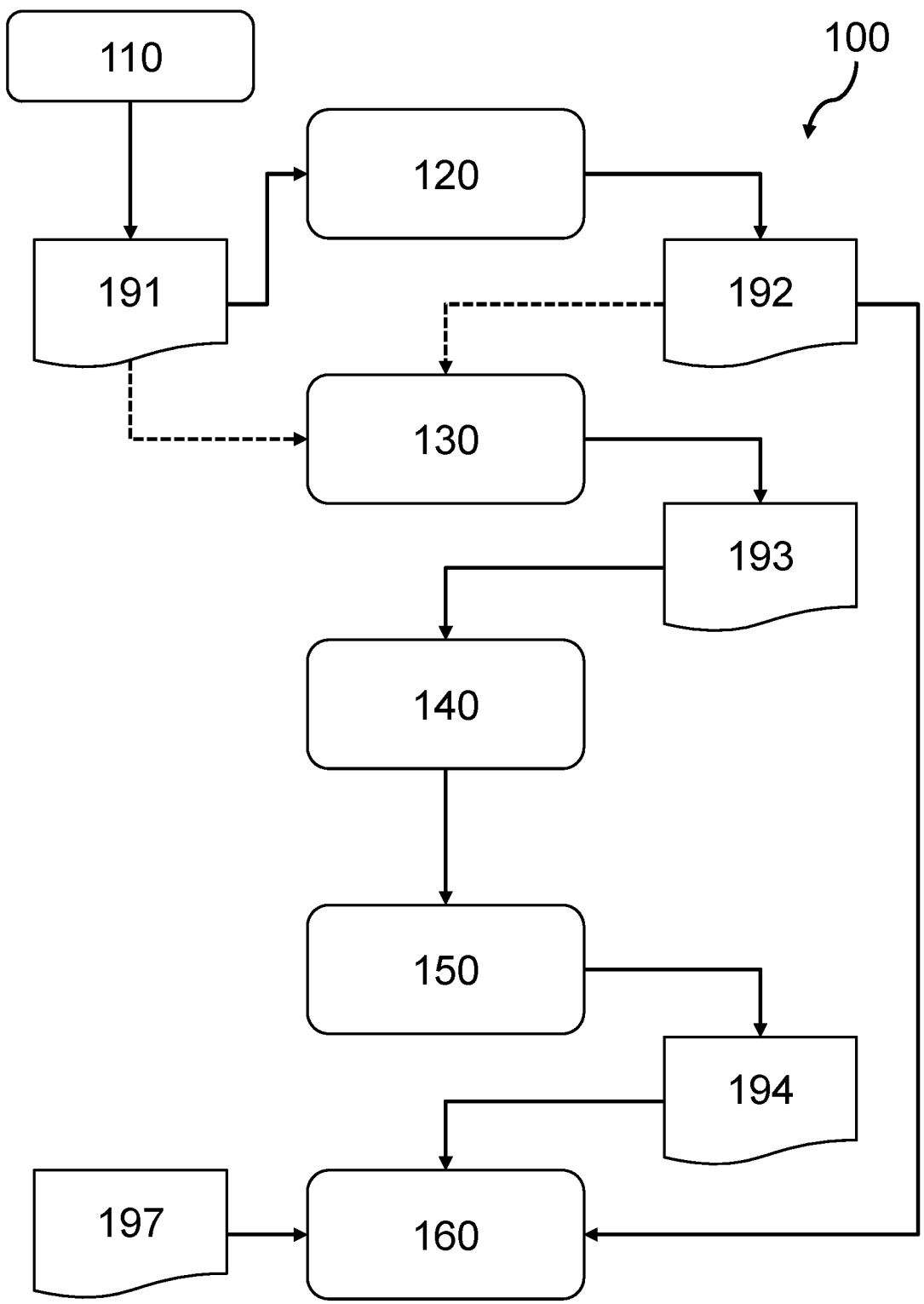
FIG. 1 illustrates a workflow performed by an embodiment of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method of generating and displaying a 3D representation of an anatomical structure of an individual. Image data of the anatomical structure is obtained and processed to obtain 2D images or image sequences corresponding to predetermined views of the anatomical structure. Anatomical landmarks are identified in the 2D images or image sequences and used to determine a 3D landmark model of the anatomical structure. The 3D landmark model is used to render and display a 3D representation of the anatomical structure. The invention relies on the use of a 3D landmark model, also known as a "pose model", to control how a 3D representation of an anatomical structure is rendered and displayed. The 3D landmark model identifies the position of anatomical landmarks of the anatomical structure.

The 3D landmark model may, for instance, identify the position of anatomical landmarks with respect to a/the 3D anatomical model of the anatomical structure. The 3D anatomical model may comprise pre-rendered data which, when suitably rendered, produces a 3D representation of the anatomical structure for display. The rendering and/or display of the 3D anatomical model is based on, i.e. dependent upon, the 3D landmark model. In particular, one or more rendering or display parameters may be defined using the 3D landmark model.

Thus, a rendering of the anatomical structure is based upon anatomical landmarks of the anatomical structure. This provides an approach for rendering and displaying a representation of the anatomical structure that is based upon important anatomical aspects of the anatomical structure, to permit rendering of predetermined anatomical views and/or predetermined parts of the anatomical structure, to ease in assessing the condition of a patient.

Embodiments of the present invention may be employed in any suitable 3D anatomical rendering scenario, such as in fetal heart assessment and/or brain assessment. The invention is of particular use in fetal heart analysis, as this area has been identified as being particularly difficult to perform accurate user analysis.

FIG. 1 schematically illustrates a workflow 100 performed by an embodiment, for understanding the underlying concept of the present disclosure.

Image data 191 of an anatomical structure is obtained in a step 110. The image data is therefore medical image data, such as ultrasound image data, magnetic resonance image data, computed tomography image data, X-ray image data and so on. The image data is any data which, when processed, can produce a 3D anatomical model of the anatomical structure (e.g. can produce a 3D image of the anatomical structure).

The image data 191 is processed in a process 120 to generate a 3D anatomical model 192 of the anatomical structure. The 3D anatomical model is a data representation of the anatomical structure which, if rendered and displayed, can produce a 3D representation (i.e. an image) of the anatomical structure. A 3D anatomical model provides information on the spatial positions of different anatomical features or boundaries of the anatomical structure. Methods for generating a 3D anatomical model from image data are well known to the skilled person.

Some examples of 3D anatomical models include triangular meshes that depict the overall shape of the (bounds of the) anatomical structure. Another example is a point cloud identifying anatomical locations (e.g. points that represent a cavity within an anatomical structure and/or points that represent elements forming the anatomical structure).

One or more (2D) image sets 193 are also obtained in a step 130. Each image set comprises one or more 2D images of the anatomical structure from a particular anatomical viewpoint, so that each image set provides a different anatomical viewpoint of the anatomical structure.

The one or more image sets 193 may be obtained by processing the image data 191 and/or the 3D anatomical model 192. In one example, a classifier (e.g. a neural network or other machine-learning method) is used to classify 2D images of the image data to identify images providing particular anatomical viewpoints. In another example, the 3D anatomical model 192 may be processed to extract one or more slices providing different 2D images. In this way, image sets 193 having one or more images of different anatomical viewpoints can be generated.

The one or more image sets 193 are then processed, in a step 140, to identify anatomical landmarks, "landmark points" or "key points" in each set of one or more 2D images. An anatomical landmark is a point of an individual's anatomy that exhibits homology within a species of the individual, but can differ with respect to different individuals, e.g. a mitrial valve point, a location of a fossa ovalis, a location of the aortic valve and so on.

The anatomical landmarks identified in each set of one or more 2D images may differ depending upon the anatomical viewpoint of the set of 2D images, e.g. as it may be known which anatomical landmarks are supposed to be present in certain anatomical viewpoints. The process 140 may comprise an image segmentation process to identify one or more predetermined anatomical landmarks in each 2D image.

Approaches for identification of anatomical landmarks in 2D medical images are widely known and understood and can employ image segmentation processes, machine-learning methods, automated classifiers and landmark model adaptations.

The identified anatomical landmarks are then processed, in a step 150, to generate a 3D landmark model 194. In particular, the identified landmarks may be mapped into a 3D co-ordinate space to generate the 3D landmark model. This is achievable because the anatomical viewpoint of each image in the image set is already known (i.e. the relationship between the images of the image set and a 3D space is already known). In this way, the anatomical landmarks can directly be mapped into or registered with respect to 3D co-ordinates, giving a patient-specific 3D landmark model with key anatomical features/junctions mapped in 3D.

Moreover, the spatial relation between the 3D anatomical model and the 3D landmark model is also determinable, as they are generated from the same image data. Thus, the relative position of the anatomical landmarks with respect to a 3D anatomical model derived from the same image data can be readily determined. In other words, the proposed approach allows the relative location of particular anatomical landmarks within the 3D anatomical model to be determined.

The 3D anatomical model 192 is then rendered and displayed in a process 160. In this way, an image of the 3D anatomical model is produced for display to a user. The rendering of the 3D anatomical model is displayed, for instance, at an output display or user interface such as a monitor or screen. The rendering and/or display of the 3D anatomical model is based upon the 3D landmark model 194 and, optionally, a user input 197.

In particular, the 3D landmark model may be used to identify the location of different anatomical features in the 3D anatomical model. This can in turn be used to improve and/or control a rendering of the 3D anatomical model, e.g. to highlight certain features of the rendering and/or provide additional information on the anatomical features contained in the rendering of the 3D anatomical model.

In some examples, one or more rendering parameters of the rendered 3D anatomical model may be based upon the 3D landmark model (and optionally, the user input). The rendering parameter(s) may include defining slicing/cutting planes for the rendering, defining a camera viewpoint, position and/or viewing direction for the rendering; defining lighting conditions for the rendering, defining colors and/or textures for the rendering and so on.

As previously explained, the 3D landmark model defines, with respect to the 3D anatomical model, the relative position of certain anatomical landmarks. This information can be used to render the 3D anatomical model based on the position of particular anatomical landmarks, e.g. to highlight or render desired anatomical features or views, to highlight (e.g. with particular lighting parameters) certain anatomical features, to appropriately texturize certain anatomical features and so on.

It is a fundamental recognition of the present invention that additional information for increasing an ease and certainty of assessing anatomical features in a rendering of a 3D anatomical model can be facilitated by rendering and displaying the 3D anatomical model using a 3D landmark model and/or providing additional information for a rendered 3D anatomical model using the 3D landmark model. This is achievable because the 3D landmark model identifies, in the 3D anatomical model, the position of certain anatomical landmarks, providing additional information for improving the rendering of the 3D anatomical model (or providing information on the rendered anatomical features of the anatomical model).

As previously explained, the 3D anatomical model and the 3D landmark model may be spatially registered with respect to one another, i.e. formed in a same 3D co-ordinate space. This is achievable as the 3D landmark model and the 3D anatomical model are generated from the same image data, meaning that the relationship between the 3D landmark model and the 3D anatomical model can be preserved. This facilitates ease of processing for rendering and displaying the 3D anatomical model based on the 3D landmark model.

In some examples, one or more display parameters and/or displayed information is based upon the 3D landmark model. For example, an anatomical viewpoint of the rendering may be determined using the 3D landmark model and (e.g. textual information of the same may be) displayed for improved user understanding. As another example, the 3D landmark model may be used to identify one or more anatomical features or parts of the anatomical structure in the rendering.

Suitable examples of how to render and display the 3D anatomical model based on the 3D landmark model are hereafter described.

The rendering parameter(s) for the 3D representation may be defined based on a desired anatomical feature or anatomical view in order to provide the user with a visualization of the desired anatomical feature or anatomical view. A desired anatomical feature or view of the 3D anatomical model can be identified based on the 3D landmark model.

For example, one or more cutting planes and/or a viewing direction for the rendering of the 3D anatomical model may be defined (using the 3D landmark model) to provide the user with a rendering that has a field of view including a desired anatomical feature and/or matching a desired anatomical view. The anatomical feature(s) and/or anatomical view can be identified from the 3D landmark model (e.g. by identifying anatomical landmarks associated with desired features and/or present within a desired anatomical view).

The cutting plane(s) define(s) the area/volume of the 3D anatomical model rendered, as is well known in the art, and may be selected so that the rendered area contains one or more desired anatomical feature(s). The position and/or orientation of the cutting plane(s) may be determined using the 3D landmark model, e.g. to identify the relative position of desired features (e.g. based on a known positional relationship between the desired features and the landmarks), to ensure the cutting plane(s) is/are positioned so that the rendered 3D anatomical model contains the desired features.

A viewing direction defines a position and orientation of a virtual camera for the rendering of the 3D anatomical model, and can be defined based on the 3D landmark model. For instance, the viewing camera may be defined to be directed at the desired anatomical feature or view, the location of which can be calculated using the 3D anatomical model. In one scenario, predetermined viewing directions are known, and contain certain anatomical landmarks at certain relative positions. The 3D landmark model may be used to select an appropriate position for the virtual camera (for rendering the 3D anatomical model) to contain the particular anatomical landmarks at the particular positions.

In this way, the 3D landmark model can be processed to identify, for rendering the 3D anatomical model, a suitable position for a virtual camera to achieve a desired anatomical view and/or to contain desired anatomical features.

The focal point for a rendering may be defined as a desired anatomical feature, or a central anatomical landmark for a desired anatomical view, and can be identified based on the 3D landmark model. For example, the focal point for a gross heart visualization would be defined as the crux of the heart.

The foregoing examples clearly demonstrate embodiments in which the content of the rendering of the 3D anatomical model and the position of the virtual camera of the rendering is based upon the 3D landmark model (e.g. to achieve a desired anatomical view and/or to render desired anatomical features).

The desired anatomical view and/or desired anatomical features may be indicated by the user input 197 (if present), which may comprise an indication of a desired anatomical feature or anatomical view. The user may, for example, select a desired anatomical feature or anatomical view from a list of available anatomical features and/or views. For example, for imaging data of a heart, a user may desire a four chamber view, a left ventricular outflow tract view, a right ventricular outflow tract view, a three-vessel view, a three vessel and trachea view, an abdominal situs view, an aortic arch view or a ductal arch view. For imaging data of a brain, a user may desire a transventricular view, a transthalamic view or a transcerebellar view.

In other examples, the desired anatomical view may be predefined or predetermined, e.g. to follow a certain protocol for assessing the condition of a patient.

As another example of a rendering parameter, one or more lighting parameters for the rendering of the 3D anatomical model may be defined based on the 3D landmark model, e.g. for effective visualization of a desired anatomical feature.

For example, during a rendering process, point light may be placed to provide a user with improved visualization of the rendered 3D representation. A spot light or a directional light may be positioned and directed to illuminate or highlight a particular/desired anatomical feature, whose position with respect to the 3D anatomical model could be identified based on the 3D landmark model.

As another example, a back light may be employed to illuminate a certain range of anatomical features, e.g. provided across a valve to provide a user with an optimal valvular anatomy visualization. The 3D landmark model may be used to determine a position of the backlight and/or a direction of light to ensure that certain anatomical features are lit in the rendered 3D representation.

Different material properties or textures may be applied to a rendering of the 3D anatomical model based on the 3D landmark model. Material properties are used to give a 3D representation (i.e. the rendering) of an anatomical structure a more realistic appearance, making it easier for a user to interpret the 3D representation, or to highlight/accent certain anatomical features. Examples of material properties include accentuated edge highlighting, shininess and specular highlights, which together result in different levels of polished appearance, rough/matt finishes and surface translucencies. The 3D landmark model may be used to determine which material properties should be applied where.

In some examples, the 3D landmark model is used to identify the location of one or more anatomical features, e.g. using a relationship between the anatomical landmarks and the anatomical features. The identified anatomical feature(s) could then be texturized (in the rendering) to accent, highlight or differentiate different anatomical features, or to texturize the anatomical feature to more closely resemble a true texture of the anatomical feature.

For instance, different types of rendering/texturizing may be employed based on the content of the rendered 3D representation (which can be determined from the 3D landmark model). As an example, a surface rendering may be used for a visualization of a chamber of the heart, and a translucent rendering for a visualization of a whole heart or the valves of the heart.

Different light transport models may be employed for improved visualization of different anatomical features, where the anatomical feature is identifiable from the 3D landmark model. For example, shadows may be less desirable when visualizing the valves of a heart because they may obscure dark artifacts (i.e. so rendering may comprise omitting rendering of shadows). On the other hand, shadows may improve a visualization of a whole heart or the chambers of a heart by providing shading and depth cues that allow a user to distinguish structures more easily.

The foregoing examples provide embodiments in which one or more rendering parameters of the 3D representation are dependent upon the 3D landmark model. In some examples, one or more rendering parameters are defined by the user input 197, with other rendering parameters being defined by the 3D landmark model.

For instance, the user input 197 may provide an indication of desired rendering parameters for the rendered 3D representation of the 3D anatomical model, such as a cutting plane and/or position of a virtual camera (e.g. viewing direction of the rendering). The 3D landmark model may be used to identify or predict the anatomical features and/or anatomical view provided by the desired rendering. The 3D landmark model may then be used to define further rendering parameter(s), such as lighting conditions, colors and/or textures based on the predicted anatomical feature and/or anatomical view.

All of the foregoing examples provide embodiments in which one or more rendering parameters of the 3D representation of the anatomical structure are based upon the 3D landmark model. In some examples, the 3D landmark model can be used to generate additional information, e.g. in the form of textual information, about the 3D representation of the anatomical structure without being used in the rendering thereof.

For instance, the rendering parameters of the 3D representation of the anatomical structure may be predefined and/or responsive to a user input. The 3D landmark model may be used to generate information about the 3D representation provided to the user.

By way of example, the rendering parameters and the 3D landmark model may be processed to identify the anatomical features contained in the 3D representation or the (closest) anatomical view provided by the 3D representation. This information can then be displayed to a user, e.g. in the form of a textual output or a graphical output indicating the relative view with respect to an anatomical model.

Additional information may also be generated and optionally displayed, e.g. information indicating the goodness of fit of the anatomical view, information identifying a direction for rotating/reslicing the 3D anatomical model that indicates the direction one should traverse to snap to one or more closest available standard views.

Thus, assistive information for aiding a user in controlling and understanding their inputs to achieve a desired anatomical view can be provided by processing the current parameters for the 3D representation and the 3D landmark model.

In some embodiments, the anatomical structure exhibits cyclic movement. For example, the anatomical structure may comprise a heart or lungs. The image data 191 may comprise image data captured over at least one entire cycle of the cyclic movement, for example, over at least one cardiac cycle or at least one respiratory cycle. The one or more image sets 193 then each comprise a sequence of 2D images representative of at least one entire cycle of the cyclic movement. The one or more predetermined anatomical landmarks are identified in each image in each image set so that the anatomical landmarks are tracked over the entire cycle.

In this way, the 3D landmark model may effectively track, over time, the position of anatomical landmarks of the 3D anatomical model. This information can be used to control the rendering of a 3D representation of the anatomical structure represented by the 3D anatomical model, e.g. to render the 3D representation at a particular point in the cycle.

Figure 2:
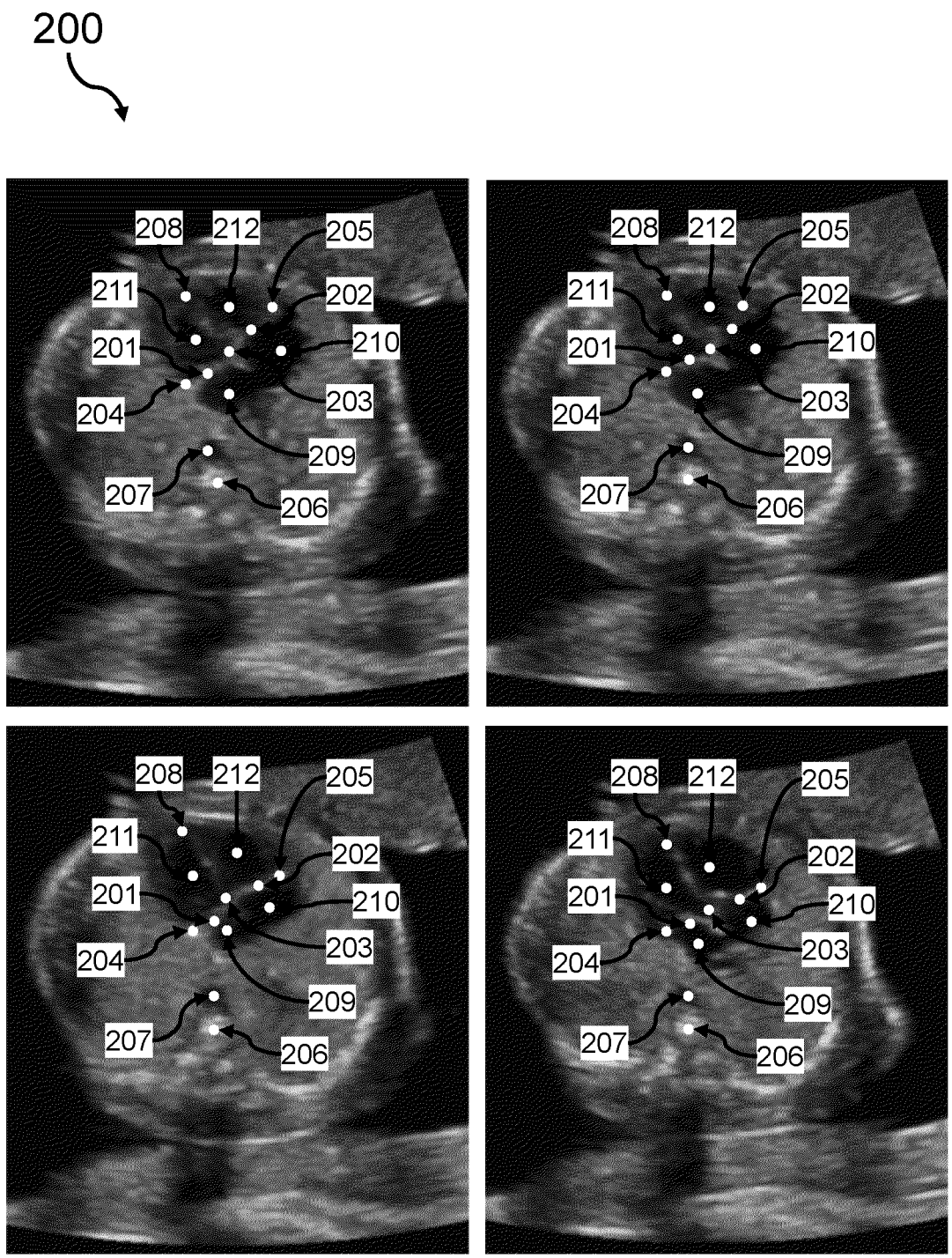
FIG. 2 illustrates a set of 2D images of a fetal heart obtained from ultrasound image data over a cardiac cycle.

FIG. 2 shows a set of 2D images 200 of a fetal heart obtained from ultrasound image data over a cardiac cycle. The set represents a four chamber view of the fetal heart at different phases of the cardiac cycle, with 12 anatomical landmarks tracked across the phases. Points 201 and 202 are the mid-points of the mitral and tricuspid valves, point 203 is the crux of the heart, points 204 and 205 are the end points of the mitral and tricuspid valves, point 206 is the spine, point 207 is the aorta, point 208 is the apex of the heart, points 209 and 210 are the left and right atria, and points 211 and 212 are the left and right ventricles.

Further sets of 2D images may be obtained from the same ultrasound imaging data, each representing a different predetermined view. For example, further sets of 2D images corresponding to a left ventricular outflow tract view, a right ventricular outflow tract view, a three-vessel view, a three vessel and trachea view, an abdominal situs view, an aortic arch view and/or a ductal arch view may be obtained from the ultrasound image data. The anatomical landmarks visible in each set of 2D images may be tracked over all phases of the cardiac cycle. The tracked points across all views may be mapped to 3D coordinates to generate a 3D landmark model.

Figure 3:
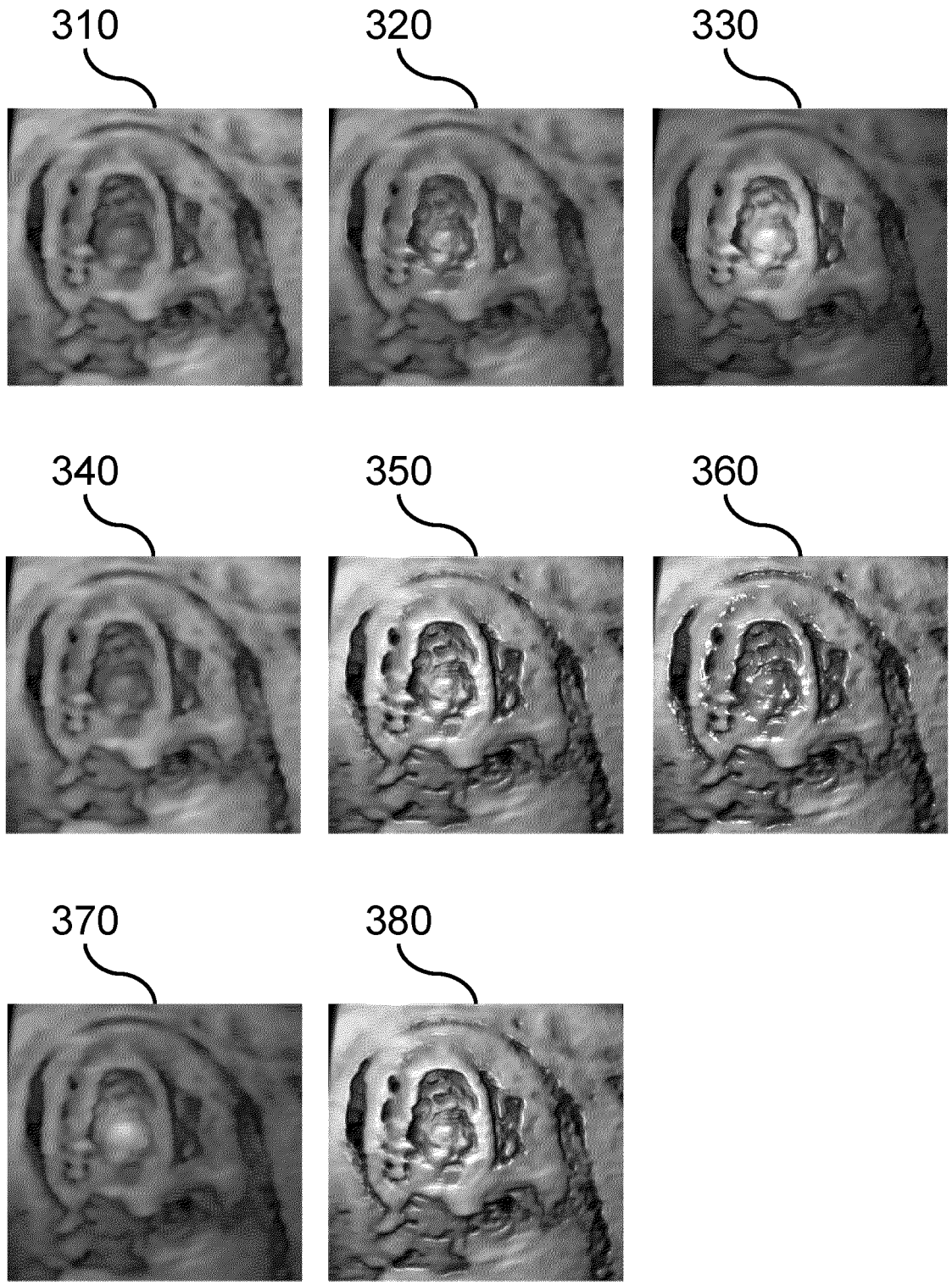
FIG. 3 illustrates a view of the left ventricle of the heart in a four chamber view with different rendering parameters applied.

FIG. 3 shows a view of the left ventricle of the heart in a four chamber view with different rendering parameters applied. The viewing parameters for the view shown in FIG. 3 can be adjusted or defined using the 3D landmark model, e.g. for improved visualization or to ensure a desired view is achieved.

The cutting planes for the 3D rendering are positioned on either side of the arterio-ventricular valves. The viewing direction is defined in terms of the position, orientation and focal point of a virtual camera. The view up vector of the camera is oriented from the left atrium to the left ventricle key point. The direction of projection is oriented orthogonal to the view up vector and the axial plane is defined by the centers of the ventricles. The focal point is the center of the left ventricle. The camera is positioned to achieve a view angle twice the distance between the left and right ventricle.

In this example, the positions of the anatomical features are used to define the viewing parameters (i.e. the cutting plane(s) and the viewing direction). These positions are determined based on the 3D landmark model generated by processing identified anatomical landmarks, as described above. Thus, the rendering of the 3D representation is based upon the 3D landmark model.

Images 310, 320 and 330 show the view of the left ventricle rendered with different lighting parameters. In image 310, the left ventricle is illuminated with ambient light. In images 320 and 330, an additional spot light source is placed in the left ventricle with the spot light direction orthogonal to the axial plane and aimed at the left ventricle key point. In image 320, the spot light cut-off is set at a quarter of the distance between the left and right ventricles, as given by the identified anatomical landmarks; in image 330, the cut-off is set at half the distance between the left and right ventricles.

The position and properties of the light sources is also determined based on the 3D landmark model.

Images 340, 350 and 360 show the view of the left ventricle rendered with different material properties. Image 370 shows the view of the left ventricle with spherical shadows applied. Image 380 shows the view of the left ventricle with surface rendering applied.

For visualizations of anatomical structures that exhibit cyclic movement, such as the heart, tracking the identified anatomical landmarks over the entire cycle allows a 3D representation of the anatomical structure to be displayed at a desired point in the cycle. Thus, a 3D representation of the anatomical structure may represent the anatomical structure at a certain point in the cycle, where the certain point is detected by tracking the movement of anatomical landmarks using the 3D landmark model.

In other words, the 3D anatomical model may track the position of anatomical landmarks in a 3D co-ordinate space over a predetermined cycle. Similarly, the 3D model may also change over the same predetermined cycle. The rendering of the 3D anatomical model may be performed to render the 3D anatomical model at a particular point in the cycle, where that particular point is selected based on the 3D anatomical mode.

In some examples, one or more rendering parameter(s) for the 3D representation may be defined or changed based on point in the cycle. For instance, the position of a spot light for lighting an anatomical feature may change as the position of the anatomical feature changes throughout the cycle (e.g. as tracked by the 3D landmark model).

Figure 4:
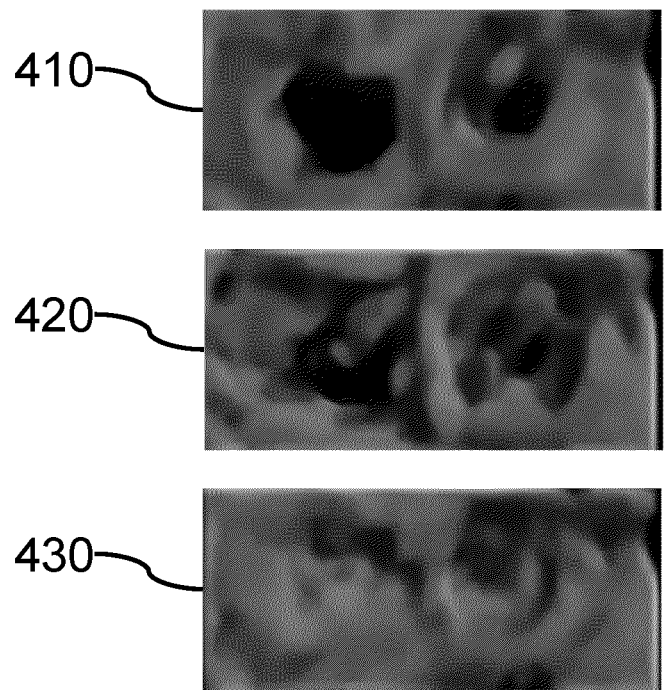
FIG. 4 illustrates a view of the mitral and tricuspid valves from valve opening to closure.

FIG. 4 shows a view of the mitral and tricuspid valves from valve opening (image 410) to closure (image 430). The tracked points 201 and 202 corresponding to the mid-points of the mitral and tricuspid valves shown in FIG. 2 can be used to select the view frames at the appropriate point or points in the cardiac cycle.

In this way, the rendered 3D representation of can provide a 3D representation of a desired anatomical structure at a particular point in the cycle of an anatomical structure. This approach can provide more useful images for assessing the condition of the patient, e.g. by automatically "freezing" a rendering of a 3D anatomical structure at clinically useful points in the cycle of an anatomical structure.

The proposed approach for rendering a 3D representation using a 3D landmark model and a 3D anatomical model can be used to create a guided viewing workflow. The guided viewing workflow may be designed to conform to clinical guidelines, e.g. for assessing or diagnosing an individual.

For example, the guided viewing workflow may conform to ISUOG guidelines for a fetal ultrasound scan. A guided fetal cardiac examination may start by displaying a 3D visualization of the four chamber view of the fetal heart, followed by 3D visualizations of the left ventricular outflow tract view, right ventricular outflow view, the three-vessel view, the three vessel and trachea view and examination of the valves, the septa etc. The proposed approach for using a 3D landmark model and a 3D anatomical model can be used to appropriately define (using the 3D landmark model) suitable rendering parameters for rendering the 3D anatomical model to achieve each view.

In some examples, visualizations of each view prescribed by a set of guidelines can then be automatically bookmarked and saved to obtain searchable views of each structure. The bookmarked visualizations may be generated using suitable rendering parameters (cutting planes, viewing parameters, lighting parameters etc.) for optimizing the display of the structures to be evaluated in that view, as described above. In this way, a set of optimal visualizations corresponding to the visualizations required by a set of guidelines may be automatically generated. A user may then simply select a desired anatomical feature or view from the bookmarked visualizations to be displayed.

The 3D landmark model may be used to automate multiplanar reformation (MPR) interactions with the displayed 3D representation. Multiplanar reformations require careful adjustment of the MPR plane to arrive at a desired plane. Historically, an operator would need to operate x, y, and z knobs and a parallel shift knob to translate and rotate the plane and adjust the pivot point of the plane. This is cumbersome and requires a skilled operator.

MPR interactions may be automated by placing pivot points (for the 3D anatomical model) based on the identified anatomical landmarks in the 3D landmark model. The pivot point(s) may in this way be automatically optimized for a particular view. For example, interaction with respect to the four chamber view of the heart is best performed with the MPR plane centered on the crux of the heart, while interaction with respect to the three-vessel view or the three vessel and trachea view is best performed with the MPR plane centered on the aorta. The range of the MPR planes may be automatically defined for each view by using the 3D landmark model to determine cutting planes that define the limits of each view. For anatomical structures that exhibit cyclical movement, the views may be presented at a most suitable point in a cycle.

For example, a 3D anatomical model and 3D landmark model generated as described above may be used to generate a set of visible planes. A list of visible planes may be displayed to a user for the user to select a desired plane. Interaction constraints for a selected plane are automatically applied by defining the center of rotation of the plane, and the range of translations and rotations of the cut plane so that any view obtained during the MPR interaction corresponds to the chosen view. For anatomical structures that exhibit cyclical movement, the automatic constraints may also be temporal, to enable the display of a dynamic MPR. For example, the display may be limited to one cycle of an anatomical structure.

The 3D landmark model may be used in an MPR assistance tool. For example, a user may freely interact with a displayed 3D representation, rotating and adjusting the cut plane, and additional information may be displayed alongside the display of the resliced image. The additional information may include, for example, the type of view being displayed, an indication of the goodness of fit of the view, the range of planes of the view being displayed, and direction markers to guide a user to one or more closest available standard views. The additional information may be determined based on the 3D landmark model. For example, the type of view being displayed may be determined based on which anatomical landmarks are visible and on their positions.

In another example, the 3D landmark model may be used to generate a personalized model that may be overlaid on cut views during a live reslice. The personalized model may be generated, for example, by deforming an ideal model using a thin plate spline warping transform with key points on the ideal model as the source landmarks and the anatomical landmarks of the 3D landmark model as the target landmarks. Any suitable augmented reality technique may be used to overlay the personalized model on the cut view. For example, the personalized model may be overlaid as a surface rendering.

Figure 5:
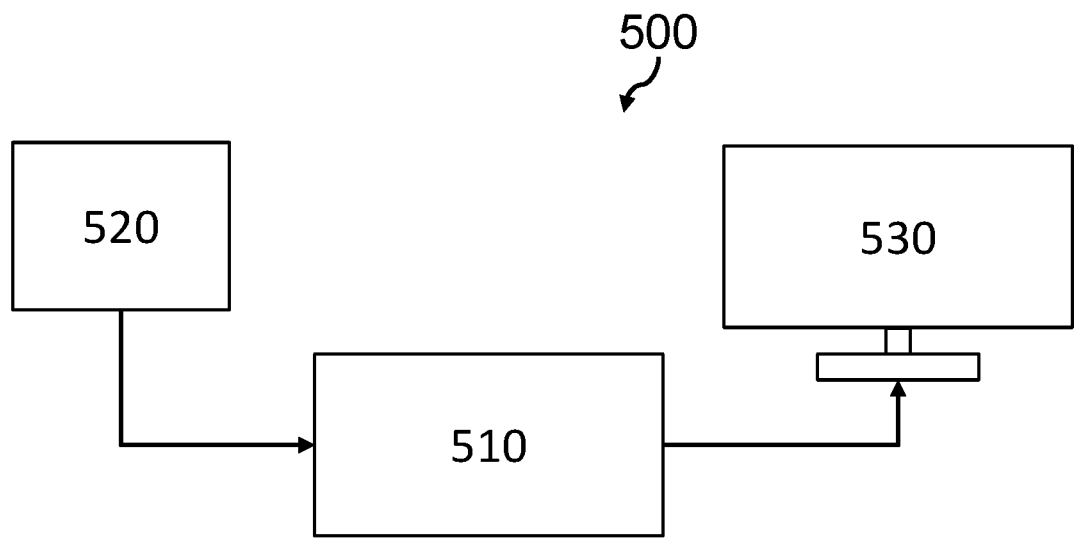
FIG. 5 illustrates a processing system.

FIG. 5 illustrates a system 500 comprising a processing system 510 according to an embodiment of the invention, as well as a memory 520 and an output display 530. The processing system 510 is designed for generating and displaying a 3D representation of an anatomical structure of an individual.

The processing system 510 is configured to obtain image data of the anatomical structure. The image data may be obtained, for instance, from the memory 520 or directly from an image data generator, e.g. an imaging system such as an ultrasound scanner.

The processing system is also configured to process the image data to generate a 3D anatomical model of the anatomical structure; and process the image data and/or the 3D anatomical model to obtain one or more sets of one or more 2D images, each identified set of one or more 2D images representing a different predetermined view of the anatomical structure.

The processing system 510 is also configured to identify one or more predetermined anatomical landmarks in each set of one or more 2D images; and process the one or more predetermined anatomical landmarks to generate a 3D landmark model.

The processing system 510 is also configured to process the 3D anatomical model and the 3D landmark model to render and display a 3D representation of the anatomical structure at the output display 530.

The output display 530 may, for instance, comprise a monitor or screen configured to provide a visual output of the 3D representation of the anatomical structure, as provided by the processing system 510.

The skilled person would be readily capable of developing a processing system for carrying out any herein described method. Thus, each step of a flow chart may represent a different action performed by a processing system, and may be performed by a respective module of the processing system.

The processing system can be implemented in numerous ways, with software and/or hardware, to perform the various functions required. A (micro)processor is one example of a processing system which employs one or more microprocessors that may be programmed using software (e.g., microcode) to perform the required functions. A processing system may however be implemented with or without employing a processor, and also may be implemented as a combination of dedicated hardware to perform some functions and a processor (e.g., one or more programmed microprocessors and associated circuitry) to perform other functions.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to". Any reference signs in the claims should not be construed as limiting the scope.

What is claimed is:

1. A computer-implemented method of generating and displaying a 3D representation of an anatomical structure of an individual, the computer-implemented method comprising:
    obtaining image data of the anatomical structure;
    processing the image data to generate a 3D anatomical model of the anatomical structure;
    processing the image data and/or the 3D anatomical model to obtain one or more sets of one or more 2D images, each identified set of one or more 2D images representing a different predetermined view of the anatomical structure;
    identifying one or more predetermined anatomical landmarks in each set of one or more 2D images;
    processing the one or more predetermined anatomical landmarks to generate a 3D landmark model; and
    processing the 3D anatomical model and the 3D landmark model to render and display a 3D representation of the anatomical structure at an output display.

2. The computer-implemented method of claim 1, wherein:
    the image data comprises image data of the anatomical structure captured over at least one cycle of a cyclic movement of the anatomical structure;
    each set of one or more 2D images comprises a sequence of 2D images that represent at least one cycle of the cyclic movement of the anatomical structure; and
    the step of processing the one or more predetermined anatomical landmarks comprises tracking, in each sequence of 2D images, one or more predetermined landmarks; and generating the 3D landmark model based on the tracked one or more predetermined landmarks in each sequence of 2D images.

3. The computer-implemented method claim 1, wherein the step of processing the 3D anatomical model and the 3D landmark model comprises defining at least one rendering parameter based on the 3D landmark model, wherein the at least one rendering parameter includes one or more of the following: a cutting plane of the rendered 3D representation; a viewing direction of the rendered 3D representation; a lighting parameter of the rendered 3D representation; one or more textures of the rendered 3D representation; and/or one or more colors of the rendered 3D representation.

4. The computer-implemented method of claim 1, wherein the step of processing the one or more predetermined anatomical landmarks comprises mapping the one or more predetermined landmarks in each set of one or more 2D images to a 3D co-ordinate system, to thereby generate a 3D landmark model.

5. The computer-implemented method of claim 1, wherein the step of displaying the 3D representation of the anatomical structure comprises:
    registering the 3D landmark model and the 3D representation in the same 3D co-ordinate space; and
    controlling the rendering of the 3D representation of the anatomical structure based on the 3D landmark model of the anatomical structure.

6. The computer-implemented method of claim 1, wherein the step of rendering and displaying the 3D representation of the anatomical structure comprises:
    defining a viewing direction for the 3D representation of the anatomical structure based on the 3D landmark model and a desired anatomical feature and/or anatomical view; and
    rendering and displaying the 3D representation of the anatomical structure based on the defined viewing direction.

7. The computer-implemented method of claim 6, further comprising a step of receiving, at a user interface, a first user input indicating the desired anatomical feature or anatomical view.

8. The computer-implemented method of claim 6, wherein the desired anatomical feature and/or anatomical view is one of a plurality of predetermined anatomical views of the anatomical structure.

9. The computer-implemented method of claim 1, wherein the step of rendering and displaying the 3D representation of the anatomical structure comprises:
    defining one or more cutting planes for the 3D representation of the anatomical structure based on the 3D landmark model and a desired anatomical feature and/or anatomical view; and
    rendering and displaying the 3D representation of the anatomical structure based on the one or more defined cutting planes.

10. The computed-implemented method of claim 1, wherein the step of rendering and displaying the 3D representation of the anatomical structure comprises:
    receiving, at a user interface, a second user input indicating one or more desired viewing directions and/or cutting planes for the 3D representation of the anatomical structure;
    rendering and displaying the 3D representation of the anatomical structure based on the received second user input;
    using the 3D landmark model to predict the anatomical feature and/or anatomical view provided by the displayed 3D representation of the anatomical structure; and
    displaying information on the predicted anatomical feature and/or anatomical view provided by the displayed 3D representation of the anatomical structure.

11. The computer-implemented method of claim 1, wherein the anatomical structure is a heart.

12. The computer-implemented method of claim 11, wherein each identified set of one or more 2D images represents a different one of the following: a four chamber view, a left ventricular outflow tract view; a right ventricular outflow tract view; a three-vessel view; a three vessel and trachea view; an abdominal situs view; an aortic arch view; and/or a ductal arch view.

13. The computer-implemented method claim 1, wherein the step of processing the image data and/or the 3D anatomical model comprises processing the image data and/or the 3D anatomical model using a machine-learning method to identify one or more sets of one or more 2D images.

14. A computer program product embodied in a non-transitory computer-readable medium comprising computer program code means which, when executed on a computing device having a processing system, cause the processing system to perform all of the steps of the method according to claim 1.

15. A processing system for generating and displaying a 3D representation of an anatomical structure of an individual, the processing system being configured to:
    obtain image data of the anatomical structure;

process the image data to generate a 3D anatomical model of the anatomical structure;

process the image data and/or the 3D anatomical model to obtain one or more sets of one or more 2D images, each identified set of one or more 2D images representing a different predetermined view of the anatomical structure;

identify one or more predetermined anatomical landmarks in each set of one or more 2D images;

process the one or more predetermined anatomical landmarks to generate a 3D landmark model; and process the 3D anatomical model and the 3D landmark model to render and display a 3D representation of the anatomical structure at an output display.

* * * * *